(12) United States Patent
Lu

(10) Patent No.: US 10,180,722 B2
(45) Date of Patent: Jan. 15, 2019

(54) AIRCRAFT USER INTERFACES WITH MULTI-MODE HAPTICS

(75) Inventor: Kanghua Lu, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 1635 days.

(21) Appl. No.: 13/117,887

(22) Filed: May 27, 2011

(65) Prior Publication Data
US 2012/0299839 A1 Nov. 29, 2012

(51) Int. Cl.
*G06F 3/01* (2006.01)
*G06F 3/041* (2006.01)
*B64D 43/00* (2006.01)

(52) U.S. Cl.
CPC .............. *G06F 3/016* (2013.01); *G06F 3/041* (2013.01); *B64D 43/00* (2013.01)

(58) Field of Classification Search
CPC ........... G05B 2219/40553; G06F 3/016; G06F 3/04886; B60W 50/16; F15B 13/14; H01H 13/85
USPC .................................................. 345/156–184
See application file for complete search history.

(56) References Cited

U.S. PATENT DOCUMENTS

| | | | |
|---|---|---|---|
| 7,369,115 B2 | 5/2008 | Cruz-Hernandez et al. | |
| 7,742,036 B2 | 6/2010 | Grant et al. | |
| 2005/0219206 A1* | 10/2005 | Schena et al. | 345/156 |
| 2006/0097996 A1 | 5/2006 | Tabata | |
| 2006/0290662 A1* | 12/2006 | Houston | A63F 13/06 345/156 |
| 2007/0236450 A1* | 10/2007 | Colgate et al. | 345/156 |
| 2007/0236474 A1* | 10/2007 | Ramstein | 345/173 |
| 2008/0062145 A1 | 3/2008 | Shahoian et al. | |
| 2008/0088602 A1* | 4/2008 | Hotelling | 345/173 |
| 2009/0085882 A1 | 4/2009 | Grant et al. | |
| 2009/0284485 A1* | 11/2009 | Colgate et al. | 345/173 |
| 2010/0013613 A1 | 1/2010 | Weston | |
| 2010/0045612 A1* | 2/2010 | Molne | G06F 1/1626 345/173 |
| 2010/0141606 A1 | 6/2010 | Bae et al. | |
| 2010/0156818 A1* | 6/2010 | Burrough et al. | 345/173 |
| 2010/0156823 A1 | 6/2010 | Paleczny et al. | |

(Continued)

FOREIGN PATENT DOCUMENTS

CN 101825967 A 9/2010

OTHER PUBLICATIONS

European search report for application No. 12 167 923.7, dated Sep. 4, 2012.
European Communication for application No. 12 167 923.7, dated Sep. 14, 2012.
Office Action for Chinese Patent Application No. 201210210483.9 dated Jul. 26, 2016.

(Continued)

*Primary Examiner* — Michael A Faragalla
*Assistant Examiner* — William Lu
(74) *Attorney, Agent, or Firm* — Lorenz & Kopf, LLP (57) ABSTRACT

Methods and apparatus are provided for a user interface with haptic feedback. The user interface includes a display element configured to display a visual image; a touch screen panel coupled to the display element and configured to receive a user input; a controller coupled to the touch screen panel and configured to generate a feedback signal based on the user input; a first actuator coupled to the controller and the touch screen panel and configured to operate in a first mode based on the feedback signal; and a second actuator coupled to the controller and the touch screen panel and configured to operate in a second mode based on the feedback signal.

19 Claims, 5 Drawing Sheets

(56) References Cited

U.S. PATENT DOCUMENTS

| | | | |
|---|---|---|---|
| 2010/0156843 A1* | 6/2010 | Paleczny | G06F 3/016 345/174 |
| 2010/0214211 A1* | 8/2010 | Dods | G06F 1/1626 345/156 |
| 2010/0225596 A1 | 9/2010 | Eldering | |
| 2010/0231367 A1 | 9/2010 | Cruz-Hernandez et al. | |
| 2010/0238116 A1* | 9/2010 | Shin | 345/168 |
| 2010/0253487 A1* | 10/2010 | Grant et al. | 340/407.2 |
| 2010/0265191 A1* | 10/2010 | Mui | G06F 3/016 345/173 |
| 2011/0006888 A1* | 1/2011 | Bae | A63F 13/00 340/407.1 |
| 2011/0090167 A1* | 4/2011 | Harris | G06F 3/016 345/173 |
| 2011/0310028 A1* | 12/2011 | Camp et al. | 345/173 |
| 2012/0028577 A1* | 2/2012 | Rodriguez | H04N 21/44008 455/41.1 |
| 2012/0081337 A1* | 4/2012 | Camp et al. | 345/177 |
| 2012/0149437 A1* | 6/2012 | Zurek | H04M 1/0266 455/566 |
| 2012/0232780 A1* | 9/2012 | Delson | A63F 13/06 701/400 |

OTHER PUBLICATIONS

CN Office Action for Application No. 201210210483.9; dated Mar. 28, 2016.
EP Examination Report for Application No. EP 12167923.7 dated Nov. 25, 2015.

* cited by examiner

AIRCRAFT USER INTERFACES WITH MULTI-MODE HAPTICS

TECHNICAL FIELD

The present invention generally relates to user interfaces of aircraft systems, and more particularly relates to aircraft user interfaces with haptic feedback.

BACKGROUND

Flight displays of aircraft systems continue to advance in sophistication, achieving increasingly higher levels of information density, and consequently, presenting a greater amount of visual information to be perceived and understood by the operator. It is important that aircraft visual displays and the associated user interfaces provide a proper cognitive mapping between the task desired from the system and the resulting implementation by the operator. As a result, such systems continuously attempt to improve instrumentation and control of the user interfaces that cooperate with the visual displays and overall aircraft systems.

Touch screen user interfaces have been advantageously used to improve user interaction in many types of systems outside of avionics, including widespread use in cell phones. Some touch screen user interfaces generate a tactile or haptic feedback in response to user inputs. Haptic feedback may provide cues that enhance and simplify the user interaction. Specifically, vibration effects may be useful to alert the user to specific events or to provide realistic feedback in the subject system. However, in certain applications, such as avionics, user interfaces with conventional haptic feedback are unsuitable for a number of reasons, including the size of the displays and the physical environment of flight.

Accordingly, it is desirable to improved user interfaces, particularly in an aircraft environment. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a user interface includes a display element configured to display a visual image; a touch screen panel coupled to the display element and configured to receive a user input; a controller coupled to the touch screen panel and configured to generate a feedback signal based on the user input; a first actuator coupled to the controller and the touch screen panel and configured to operate in a first mode based on the feedback signal; and a second actuator coupled to the controller and the touch screen panel and configured to operate in a second mode based on the feedback signal.

In accordance with another exemplary embodiment, a method is provided for controlling haptic feedback in a user interface having a first actuator and a second actuator coupled to a touch screen display panel. The method includes operating the first actuator in a first mode to generate a first portion of the haptic feedback on touch screen panel with first nodes; and operating the second actuator in a second mode to generate a second portion of the haptic feedback on touch screen panel with second nodes, different from the first nodes.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide aircraft systems and methods with improved user interfaces. Particularly, the systems and methods include user interfaces with a touch screen panel having first and second actuators that are operated to generate a haptic response. The first and second actuators are driven to respectively generate first and second modes. The modes are selected to have non-overlapping nodes and to generate a desirable haptic response. The actuators may be positioned around the perimeter of the touch screen panel in an arrangement that more readily achieves the selected modes. For example, some arrangements may be asymmetrical. In particular, the first and second actuators operate at different modes to generate a consistent haptic response over the entire touch screen panel.

Figure 1:
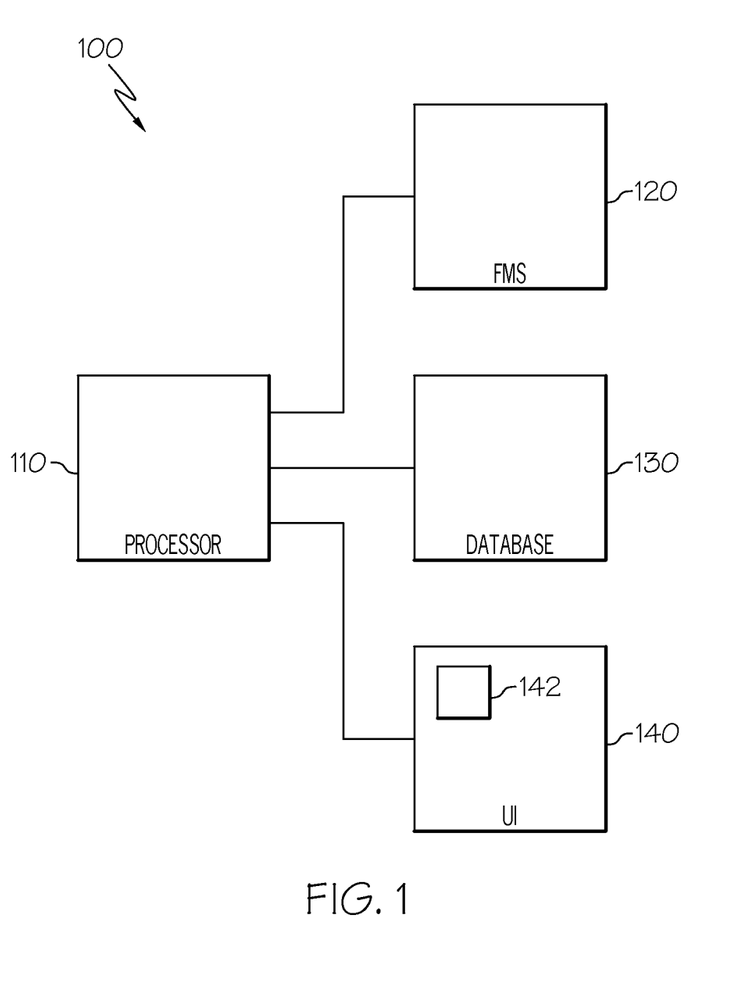
FIG. 1 is schematic block diagram of an aircraft system in accordance with an exemplary embodiment.

FIG. 1 is schematic block diagram of an aircraft system 100 in accordance with an exemplary embodiment. The aircraft system 100 may include a processor 110 configured to communicate with a flight management system (FMS) 120, a database 130, and user interface 140. The processor 110, FMS 120, database 130, and user interface 140 may be individual components or integrated with one another, either onboard or external to the aircraft. Also, for example, system 100 can be arranged as an integrated system or a subsystem of a more comprehensive aircraft system.

The processor 110 may be a computer processor such as, for example, a microprocessor, digital signal processor, or any suitable processor capable of at least receiving and/or retrieving aircraft status information, navigation and control information (e.g., from FMS 120) and user inputs, and generating suitable control signals for the functions described below. The processor 110 may be a dedicated processor, for example, of the user interface 140 and/or FMS 120.

In general, the FMS 120 is a specialized computer system that assists the pilot in performing a wide variety of in-flight tasks. As one example, the FMS 120 may include a navigation system that generates a flight plan and a guidance system that assists the pilot in flying the flight plan. The FMS 120 may use data from a number of sources, including various sensors and the database 130. The database 130 can be a memory device (e.g., non-volatile memory, disk, drive, tape, optical storage device, mass storage device, etc.) that stores aircraft information used by the processor 110 or FMS 120.

The user interface 140 may include any component that enables the user to communicate and otherwise interact with the system 100. As described in greater detail below, the user interface 140 may include a display element for displaying various types of computer-generated symbols and information representing, for example, avionics information in an integrated, multi-color or monochrome form. As such, many known display monitors are suitable for displaying this type of information, symbols and data, such as, for example, various CRT and flat-panel display systems (e.g., CRT displays, LCDs, OLED displays, plasma displays, projection displays, HDDs, Heads-Up Displays/HUDs, etc.). Such displays may include various graphical elements associated with, for example, the position, flight-plan and/or other indicia of the aircraft's operational state. The user interface 140 may include input elements such as keyboards, pointer devices, microphones, switches, dials, joysticks, mice, trackballs, and the like. In one exemplary embodiment, the user interface 140 may be a primary flight display (PFD) or a multi-function control and display unit (MCDU).

As shown in FIG. 1, the user interface 140 may further include an integrated touch screen display system 142 that enables a user to interact with visual display elements by touching the display system 142. As described in greater detail below, the touch screen display system 142 uses multi-mode actuators to provide the haptic feedback to the user.

Figure 2:
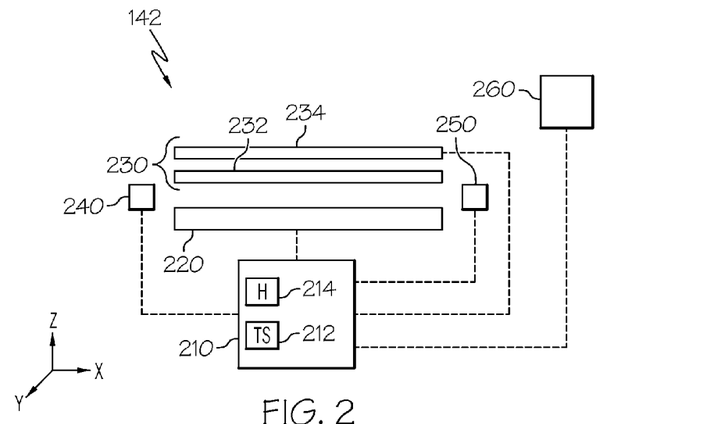
FIG. 2 is a schematic block diagram of a display system of the aircraft system of FIG. 1 in accordance with an exemplary embodiment.

FIG. 2 is a schematic block diagram of the touch screen display system 142 of the aircraft system 100 of FIG. 1 in accordance with an exemplary embodiment. The display system 142 includes a controller 210, a display element 220, a touch screen panel 230, at least two actuators 240 and 250, and control devices 260. It should be noted that FIG. 2 is merely schematic and that the particular arrangement of the actuators 240 and 250 and touch screen panel 230 is discussed in greater detail below. Although not shown, the touch screen display system 142 may include or have access to databases (e.g., database 130 or a dedicated database), networks, and other sensors or components, as necessary or desired.

Generally, the controller 210 may include a processing element and memory for storing instructions that are executed by the processing element. Particularly, as discussed below, the controller 210 may generate signals for displaying an interactive visual display on the display elements 220, interpreting a user response on the touch screen panel 230, and generating a haptic feedback for the user on the touch screen panel 230 via the actuators 240 and 250. The controller 210 may be a dedicated controller or integrated as part of another system, such as integrated with the processor 110 of FIG. 1. As described below, the controller 210 may generally include a touch screen controller 212 and a haptics controller 214.

In general, the display element 220 may be any type of display apparatus that provides a visual display to a user based on visual display commands from the controller 210. As described above, the display element 220 may provide aircraft and/or flight information. The display element 220 further displays graphical user input elements, such as graphically presented keyboards, buttons, menus, knobs, switches, graphics, sliders, arrows, pull-down menus, graphics with active elements, functional icons, and the like that enable the user to interact with the system 100 (FIG. 1).

The display element 220 may be part of a number of different display devices that generate visual output, including CRT display device, a flat panel display device, a plasma display device, an electro-luminescent display device, a Light Emitting Diode (LED) display device, a holographic display device such as a Head Up Display (HUD), a Micro Mirror Device (MMD) display device, or the like. In one embodiment, the display element 220 is a liquid crystal display (LCD) panel.

The touch screen panel 230 generally includes a plate 232 and a sensor array 234 arranged on the plate 232. In one exemplary embodiment, the plate 232 may be transparent, translucent, a color filter, or other light permeable panel arranged over or in front of the display element 220. For example, the plate 232 may be formed by polycarbonate, glass or a plastic material. In one exemplary embodiment, the plate 232 may be omitted and/or incorporated into the display element 220.

The sensor array 234 is coupled to or integrated with the plate 232 and includes a number of sensors operable to detect a physical manipulation of the display system 142. As shown in FIG. 2, the sensor array 234 and the plate 232 are substantially planar and are arranged substantially perpendicular to the z-axis. Particularly the sensor array 234 is configured to sense the touch of a user's finger, stylus, or other object and provide a touch location signal, such as the x and y coordinates, to the controller 210. Such user inputs may include single or multi-touch inputs. As examples, the sensor array 243 may include capacitive or resistive sensor arrays as transparent films that are overlaid on the plate 232 and display element 220 and that respectively detect capacitive and voltage changes resulting from a user pressing on the plate 232. In addition to resistive sensor arrays and capacitive sensor arrays, exemplary embodiments may use sensor arrays that are implemented by any other known technology, such as surface acoustic waves.

The touch screen display system 142 may further be responsive to inputs from control devices 260 other than the sensor array of the touch screen panel. For example, such control devices 260 may include keyboards, buttons, menus, knobs, switches, and the like that enable the user to interact with the system 100 (FIG. 1). The controller 210 receives the inputs from the control devices 260 and implements the appropriate functions.

The actuators 240 and 250 may be any device that generates haptic effects in response to signals received from controller 210. Although FIG. 2 depicts two actuators 240 and 250, in other embodiments additional actuators may be provided. For example, actuators 240 and 250 may include one or more force applying mechanisms that are capable of applying a tactile force to a user of the touch screen panel 230. In one embodiment, the haptic effects are in the form of pulses, vibrations, and textures to the touch screen panel 230, and different haptic effects may be generated by varying the magnitude, frequency and duration of the vibrations. Particularly, the haptics controller 214 provides feedback signals to the actuators 240 and 250, which each include drive circuits and/or the other electronic components and circuitry used to supply the required electrical current and voltage to cause the desired haptic effects on the touch screen panel 230. In other embodiments, the drive circuits may be separate from the actuators 240 and 250 and/or incorporated into the haptics controller 214.

The first and second actuators 240 and 250 may be, for instance, linear actuators that are arranged to apply a force to the touch screen panel 230 in the z direction. Although not shown, springs or compliant elements, such as helical springs, leaf springs, flexures, foam, rubber, or the like may be provided to enable movement of the touch screen panel 230 in the z-direction. The first and second actuators 240 and 250 may be, for example, electromagnetic actuators, an Eccentric Rotating Mass ("ERM") actuators in which an eccentric mass is moved by a motor, Linear Resonant Actuators ("LRA") in which a mass attached to a spring is driven back and forth, or "smart materials" such as piezo-electric, electro-active polymers or shape memory alloys that move in response to electric signals.

In the depicted embodiment, the actuators 240 and 250 are coupled to the underside of the touch screen panel 230, although in other embodiments, the actuators 240 and 250 may be coupled to the other side of the touch screen panel 230 or along an edge. Other attributes of the actuators 240 and 250, including additional details about the position and arrangement, are discussed below.

The touch screen display system 142 may be operated as described below. The display element 220 generates a visual display for the user, which may include interactive display components, such as menus or keyboards. The touch screen panel 230 overlays the display element 220 to receive the user input, and the sensor array 234 detects the nature and location of the user input on the plate 232 and provides user input signals to the touch screen controller 212. The touch screen controller 212 interprets the user input signals to determine the appropriate action, e.g., adjusting the visual display on the display element 220 and/or performing an action related to the operation of the aircraft system 100 (FIG. 1). In one embodiment, the touch screen controller 212 compares the user input signals to predetermined user input signals stored in memory to determine the associated function. Additionally, the haptics controller 214 determines the appropriate haptic response to the user input signals and provides feedback signals to the first and second actuators 240 and 250. As noted above, the haptics controller 214 may include the circuitry to drive the actuators 240 and 250.

The first and second actuators 240 and 250 receive the feedback signals and generate the haptic response on the touch screen panel 230 to provide a tactile sensation for the user in response to the user input. As described in greater detail below, the first and second actuators 240 and 250 are operated such that the combined portions of haptic response are generally consistent over the entire touch screen panel 230. Particularly, the first and second actuators 240 and 250 are positioned relative to one another and to the touch screen panel 230 to produce different modes with non-overlapping nodes, which are discussed in greater detail below.

Figure 3:
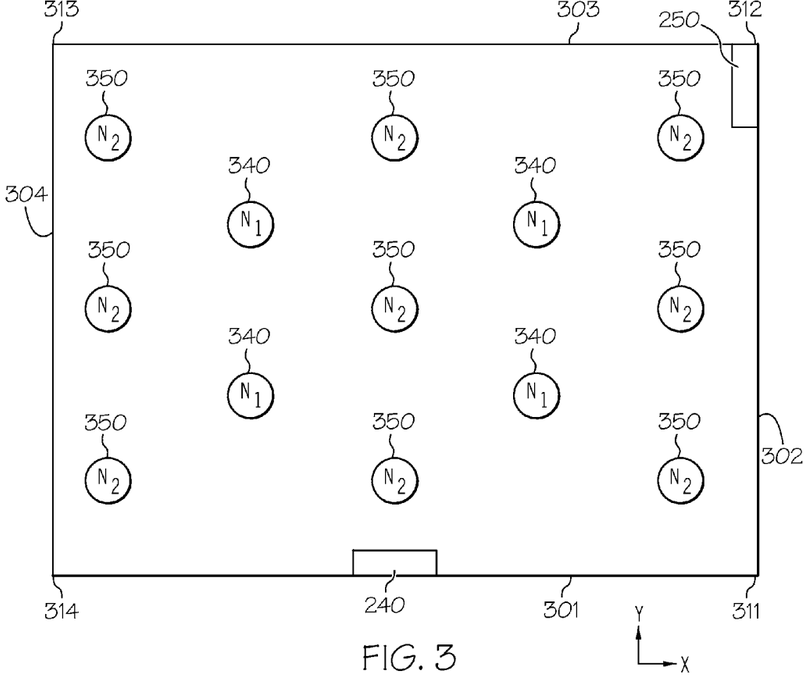
FIG. 3 is a schematic plan view of the display system of FIG. 2 in accordance with a first exemplary embodiment.

FIG. 3 is a plan view of the display system 142 of FIG. 2 in accordance with a first exemplary embodiment. FIG. 3 particularly shows the relative positions of the touch screen panel 230 and the actuators 240 and 250 in an xy-plane. In the embodiment of FIG. 3, the touch screen panel 230 is rectangular with first, second, third, and fourth sides 301-304 respectively joined at first, second, third, and fourth corners 311-314. In other embodiments, the touch screen panel 230 may have other shapes including circular, elliptical, and any polygon having more or fewer than four sides. Typically, the touch screen panel 230 is approximately the same size as or slightly larger than the display element 220 (FIG. 1). In one exemplary embodiment, the touch screen panel 230 has a width (e.g., in the x-direction) greater than 10 inches or 15 inches, although any suitable size may be provided.

In the depicted embodiment, the first actuator 240 and second actuator 250 are mechanically coupled to the touch screen panel 230 along the perimeter, generally on the underside of an edge, although other positions are possible. Typically, the first and second actuators 240 and 250 are positioned to provide the desired haptic feedback, as described below, without obscuring the view of the display element 220 (FIG. 2).

As particularly shown in FIG. 3, the first actuator 240 is positioned on the first side 301 of the touch screen panel 230 approximately at a midpoint between the first and fourth corners 311 and 314. During operation, the first actuator 240 generates a first portion of a haptic response on the touch screen panel 230. Based on characteristics of the touch screen panel 230, the position of the first actuator 240, and the frequency of the oscillations of the first actuator 240, the first portion of the haptic response may be characterized as a first mode that develops standing waves in the xy-plane with a number of nodes 340. In one exemplary embodiment, the term "mode" refers to a standing wave with peaks corresponding to the maximum vibration or haptic effect and nodes with minimal vibration or haptic effects. As such, the pattern of nodes 340 schematically shown in FIG. 3 generally corresponds to the areas at which the standing waves generated by the first actuator 240 have zero-values. In other words, if unaddressed, the nodes 340 correspond to areas at which the first actuator 240 fails to generate a haptic response that may be felt by the user.

Similarly, the second actuator 250 generates a second portion of a haptic response on the touch screen panel 230. Based on characteristics of the touch screen panel 230, the position of the second actuator 250, and the frequency of the oscillations of the second actuator 250, the second portion of the haptic response may be characterized as a second mode that develops standing waves in the xy-plane with a number of nodes 350. The pattern of nodes 350 schematically shown in FIG. 3 generally corresponds to the areas at which the standing waves generated by the second actuator 250 have zero-values. In other words, if unaddressed, the nodes 350 correspond to areas at which the second actuator 250 fails to generate a haptic response that may be felt by the user.

However, the first and second actuators 240 and 250 are respectively positioned and operated such that the nodes 340 and 350 do not overlap. Since the nodes 340 and 350 do not overlap, the haptic response is generated over the entire touch screen panel 230, e.g., there are no "dead spots" because the first actuator 240 generates a response at the nodes 350 associated with the second actuator 250 and vice versa. In one exemplary embodiment, the non-overlapping positions of the nodes 340 and 350 are a result of the selection of modes, which in this embodiment also results in an asymmetrical arrangement of the first and second actuators 240 and 250. In this embodiment, the asymmetrical arrangement includes placing the first actuator 240 on the first side 301 and the second actuator 250 on the second corner 312.

The actuators 240 and 250 provide a relatively large vibration sensation as a haptic response, which is especially important in the aircraft system 100 (FIG. 1) that is subject to other vibrations caused by the aircraft engines that may otherwise interfere with the haptic response. In one exemplary embodiment, the haptic response of the touch screen panel 230 may be at least 10 Gee (force expressed as a function of gravity) over the entire touch screen panel 230.

Figure 4:
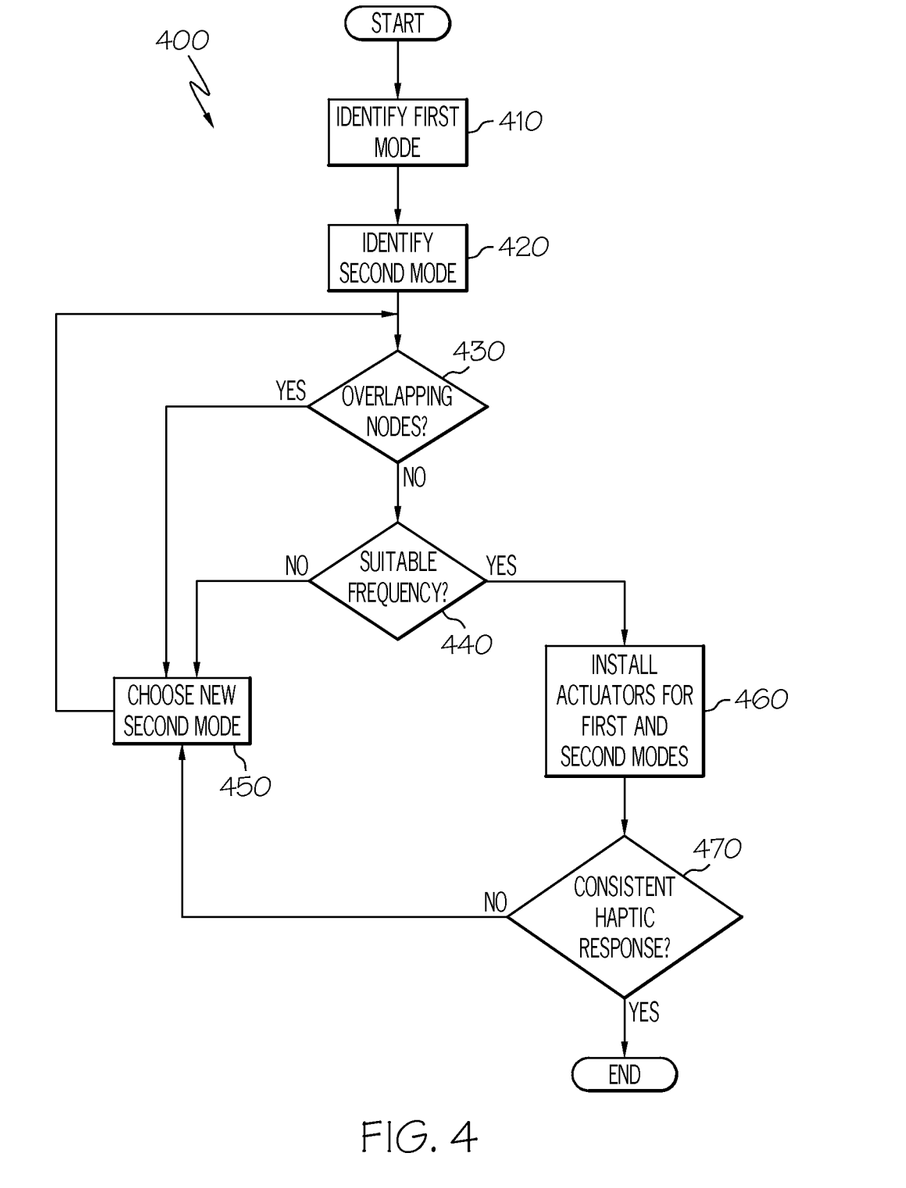
FIG. 4 is a flowchart of a method for controlling haptic feedback in a user interface in accordance with an exemplary embodiment.

Additional details about the selection of the modes and positioning of the actuators 240 and 250 are discussed in FIG. 4. FIG. 4 is a flowchart of a method 400 for controlling haptic feedback in a user interface in accordance with an exemplary embodiment. In one exemplary embodiment, the user interface 140 is implemented as the user interface 140 described above, and as such, FIG. 2 is referenced in the discussion below.

In a first step 410, a first mode associated with the first actuator 240 is selected or identified, and in a second step 420, a second mode associated with the second actuator 250 is selected or identified. As noted above, the term "mode" refers to a standing wave generated by the actuator (e.g., actuator 240 or 250) characterized in the xy-plane as a pattern of peaks corresponding to the maximum vibrations and nodes with minimal vibrations. With respect to the haptic response resulting from a mode, the peaks of the mode correspond to the maximum amount of haptic response and the nodes correspond an absence of haptic response. As described below, the nature of the mode is based on characteristics of the touch screen panel 230 and the position and frequency of the actuator (e.g., actuator 240 or 250), Reference is briefly made to FIG. 5, which is a schematic representation of exemplary modes (e.g., modes 501-516) that may be selected in steps 410 and 420 (and subsequent step 450 discussed below). The modes 501-516 are depicted as a plan view of the peaks and nodes in the xy-plane. Mode 514 is labeled for describing the schematic representations and, as shown, the circular portions 524 of the modes represent peaks of the standing waves, the lines 526 represent boundaries between standing waves, and the intersection 528 of the lines 526 generally represent the location of the nodes.

Figure 5:
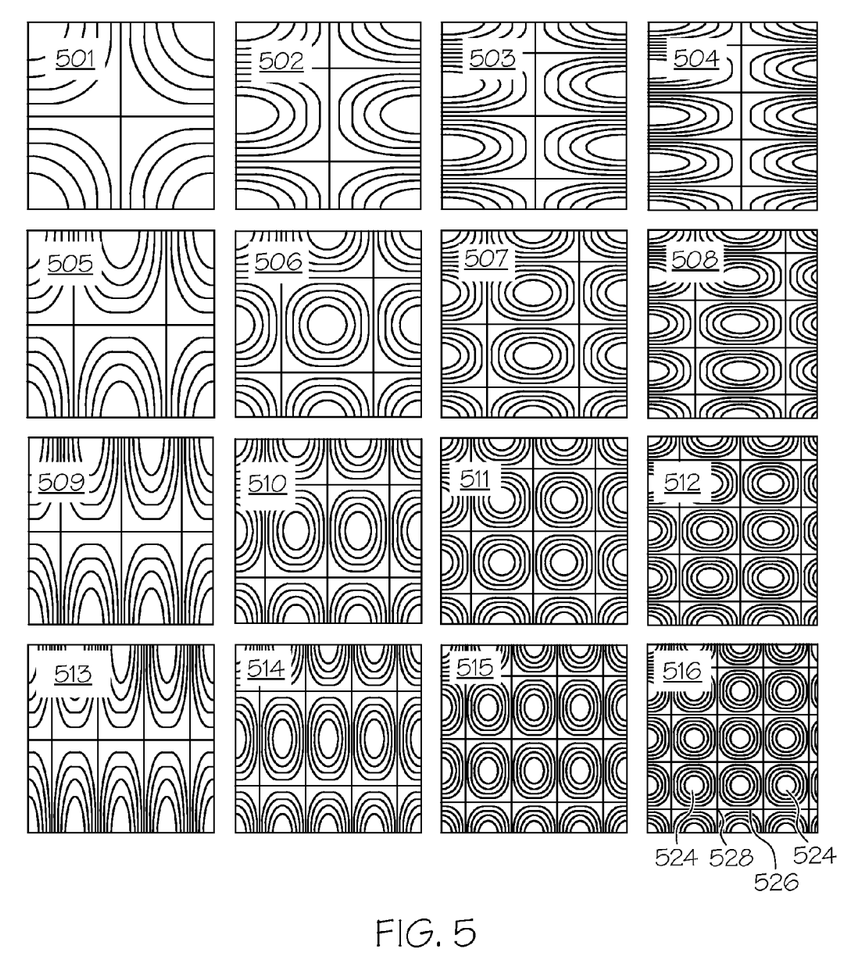
FIG. 5 is a schematic representation of exemplary modes used in the method of FIG. 4.

In FIG. 5, the modes 501-516 are grouped according to the number and direction of the peaks. In other words, the modes 501-516 may be characterized by the label (m, n) where (m) is the number of standing waves in the x-direction and (n) is the number of standing waves in the y-direction. For example, mode 501 may be characterized as a (1, 1) mode because one full standing wave is generated in the x-direction and one full standing wave is generated in the y-direction. As another example, mode 507 may be characterized as a (2, 3) mode because two full standing waves are generated in the x-direction and three full standing waves are generated in the y-direction.

With continuing reference to FIG. 5, the modes are generated by various resonant frequencies associated with the touch screen panel 230. In other words, the actuators 240 or 250 may be oscillated at particular resonant frequencies to generate the desired mode. The resonant frequency for each mode may be a function of the material of the touch screen panel 230, the mounting arrangement (e.g., fixed or floating edges), the dimensions of the touch screen panel 230, and other considerations. As depicted in FIG. 5, higher modes correspond to higher frequencies. As discussed below, there are advantages and disadvantages in selecting a particular mode. The particular resonant frequency associated with each mode may be determined by computer simulation (e.g., finite-element analysis) or experimental testing. Each mode may be an eigen-function of partial-differential equations in which the frequency is the characteristic frequency of the eigen-function.

Accordingly, in steps 410 and 420, first and second modes are selected. For example, mode 506 (e.g., the (2, 2) mode)) may be selected as the first mode, and mode 511 (e.g., the (3, 3) mode) may be selected as the second mode. In one exemplary embodiment, the first mode in step 410 is generally selected as a mode with known acceptable characteristics, and the second mode in step 420 is selected as a different mode that is further evaluated in the subsequent steps discussed below.

In step 430, the modes are evaluated to determine if the nodes overlap. From a visual inspection of FIG. 5, the locations of the nodes may be compared. As an example, mode 501 and mode 511 have overlapping center nodes. As such, in step 430, selection of such modes would be unsuitable and the method 400 would proceed to step 450 in which a new second mode is selected until modes with nonoverlapped nodes are achieved. In the example above, mode 506 and mode 511 do not have overlapping nodes, and as such, the method 400 proceeds to step 440.

In step 440, the associated frequency of the second mode is considered based on a number of possible factors. For example, some of the considerations for evaluating a frequency include the ease or difficulty at which the frequency may be implemented into the touch screen panel 230 and the haptic response. For example, relatively low frequencies and relatively high frequencies may be difficult to achieve because of the size or inherent properties of the touch screen panel 230 and the type of actuator 250. As examples, mode 501 may have a frequency too low to readily implement in the touch screen panel 230 and mode 516 may have a frequency too high to readily implement. Additionally, some frequencies may be too high to produce a haptic feedback that may be readily sensed by a user. For example, the nerves of a user's finger may not be sensitive enough to feel the relatively high frequencies of mode 516. If the second mode is determined to be unsuitable for the touch screen panel 230, the method 400 proceeds to step 450 and a new second mode is selected, which is subsequently evaluated in steps 430 and 440.

If the frequency of the second mode is acceptable, the method 400 proceeds to step 460. In step 460, the actuators 240 and 250 are mounted in positions on the touch screen panel 230 to generate the modes. In one exemplary embodiment, the actuators 240 and 250 may be mounted in positions that correspond to a peak on the edge of the touch screen panel 230. In general, the modes are more readily achieved with the actuators at the peaks. For example, as shown in FIG. 5, all of the modes 501-516 have peaks at the respective corners. As another example, mode 506 has a peak at the midpoint of each of the edges.

One example may be described with the arrangement of FIG. 3. As shown in FIG. 3, the first actuator 240 generates the first mode (which in this example is the (2, 2) mode 506 of FIG. 5) and as such is positioned at a midpoint of the edge 301. The second actuator 250 generates the second mode (which in this example is the (3, 3) mode 511 of FIG. 5) and as such is positioned at one of the corners 312. By supplying the appropriate frequencies at the selected positions, the first and second actuators 240 and 250 generate modes with nonoverlapping nodes 340 and 350. The positions of the actuators 240 and 250 may be provided at any of the peaks. For example, actuator 240 may be positioned at any edge midpoint or at any corner to generate the (2, 2) mode 506 of FIG. 5 and actuator 250 may be in the appropriate positions along any edge (e.g., about one-third of the distance from a respective corner) or at any corner. The particular positions may be selected based on ease of manufacturing or installation.

Referring briefly again to FIG. 4, in a final step, the actuators 240 and 250 operate and the touch screen panel 230 is evaluated to confirm that the haptic response is consistent over the xy-plane of the touch screen panel 230, as expected. For example, the nonverlapping characteristics of the nodes may be evaluated to confirm that the haptic response over the entire touch screen panel 230 is greater than a predetermined value (e.g. 10 Gee) or that non-uniformity (e.g., the difference between a maximum haptic response and a minimum haptic response) does not exceed a predetermined value. If the haptic response is acceptable, the method 400 is completed. Otherwise, a new second mode may be selected and steps 450, 430, 440 and 460 may be repeated.

Figure 6:
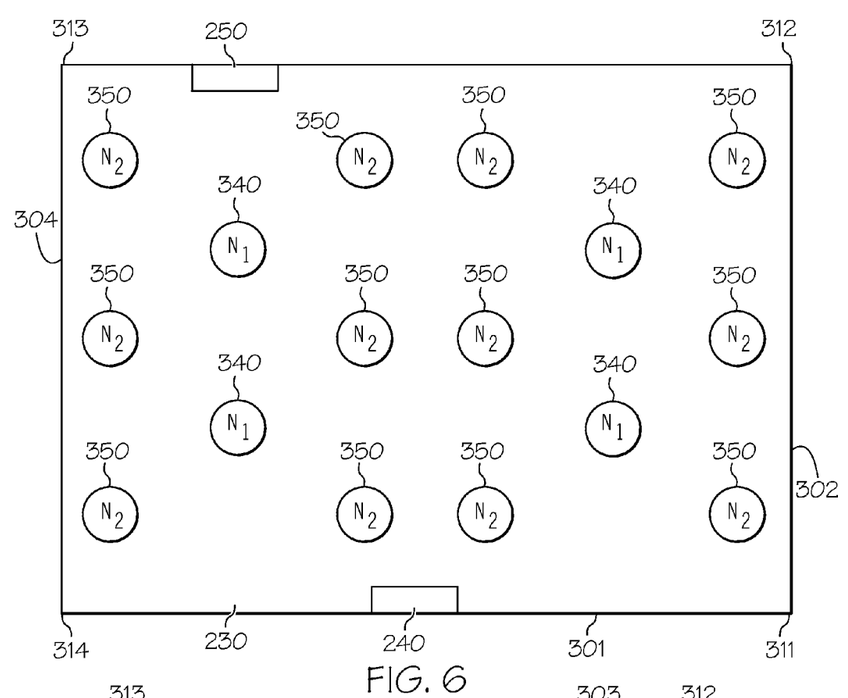
FIG. 6 is a plan view of the display system of FIG. 2 in accordance with a second exemplary embodiment.
Figure 7:
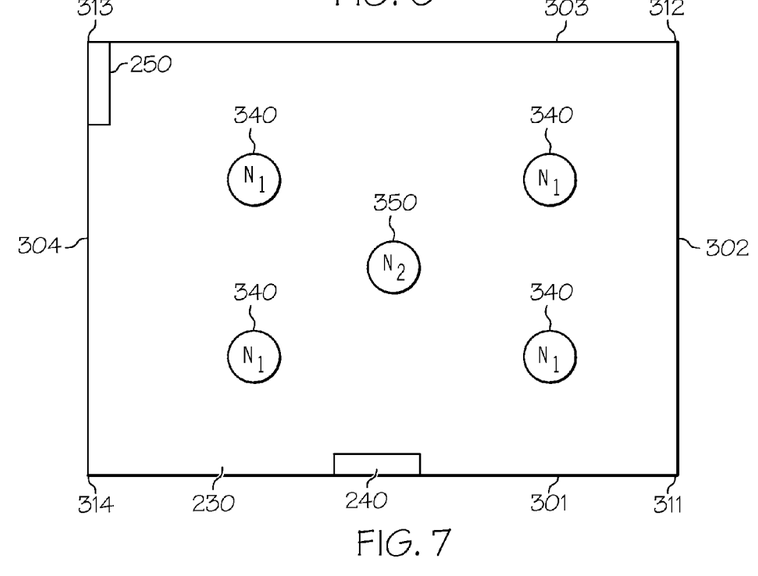
FIG. 7 is a plan view of the display system of FIG. 2 in accordance with a third exemplary embodiment.

FIG. 3 is just one exemplary arrangement of the first and second actuators 240 and 250 relative to the touch screen panel 230. FIGS. 6 and 7 are plan views of the display system 142 of FIG. 2 in accordance with additional exemplary embodiments. Like FIG. 3, the depicted embodiments of FIGS. 6 and 7 include the rectangular touch screen panel 230 with sides 301-304 and corners 311-314 and the first actuator 240 positioned approximately at a midpoint on the first side 301. However, in the embodiment of FIG. 6, the second actuator 250 is positioned approximately a third of the distance between the second and third corners 312 and 313. Referring additionally to FIG. 5, the first node of actuator 240 corresponds to a (2, 2) node 506 to generate the pattern of nodes 340 and the second mode of actuator 250 corresponds to a (4, 3) mode 515 to generate the pattern of nodes 350 depicted in FIG. 6.

In the embodiment of FIG. 7, the second actuator 250 is positioned approximately at the third corner 313. Referring additionally to FIG. 5, the first node of actuator 240 corresponds to a (2, 2) node 506 to generate the pattern of nodes 340 and the second mode of actuator 250 corresponds to a (1, 1) mode 501 to generate the pattern of nodes 350 depicted in FIG. 7. The arrangements of FIGS. 6 and 7 produce nodes 340 and 350 that do not overlap, and as such, generates haptic responses over the entire touch screen panel 230. In further embodiments, the first and second actuators 240 and 250 may be arranged in other positions and driven with other frequencies that do not produce overlapping nodes, including on one of the first and third sides 301 and 303, and one of the second and fourth sides 302 and 304, and any combination of sides 301-304 and corners 311-314.

Accordingly, systems and methods are provided with improved user interfaces for avionics applications. The feedback provided on the touch screen panel improves flight crew awareness by providing an improved "look and feel" for operation, while taking advantage of enhanced touch screen flexibility and capabilities. The user interfaces may include touch screen panels that reduce flight deck panel clutter and costs by replacing separate mechanical or electrical knobs, switches and other user input devices. The feedback provided by the haptic responses results in a more intuitive and easier to interpret operation and requires less heads-down time, particularly during flight operations that are already subject to vibrations caused by the aircraft and other distractions. The systems and methods described in FIGS. 1-7 generate a consistent haptic feedback in response to a user input. The consistent haptic feedback is accomplished by manipulating the modes generated by the actuators, which may prevent or limit extensive rework or expense of current designs. The systems and methods provide a touch screen display without "dead spots," particularly in an environment that requires a robust response such as in an aircraft. Although exemplary embodiments are described above with reference to avionic applications, such user interfaces may be used in any application, including mobile phones, tablet computers, and other control systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A user interface, comprising:
   a display element configured to display a visual image;
   a touch screen panel coupled to the display element and configured to receive a user input, wherein the touch screen panel is mounted within the user interface relative to the display element with floating edges;
   a controller coupled to the touch screen panel and configured to generate a feedback signal based on the user input;
   a first actuator coupled to the controller and the touch screen panel and configured to operate in a first mode based on the feedback signal; and
   a second actuator coupled to the controller and the touch screen panel and configured to operate in a second mode based on the feedback signal,
   wherein the first mode includes a first pattern of nodes and peaks and the second mode includes a second pattern of nodes and peaks, the first pattern of nodes and the second pattern of nodes being non-overlapping relative to one another on the touch screen panel,
   wherein the touch screen panel is defined by a perimeter with a plurality of sides joined at a plurality of corners, the first actuator being positioned adjacent one of the sides and the second actuator being positioned adjacent one of the corners, and
   wherein the first actuator and the second actuator are asymmetrically arranged with respect to one another relative to the touch screen panel such that one of the peaks of the first pattern or the second pattern occurs at each of the plurality of corners.

2. The user interface of claim 1, wherein the first mode has a first frequency and the second mode has a second frequency, different that the first frequency.

3. The user interface of claim 1, wherein the first mode includes a third pattern of peaks, the first actuator being positioned at one of the peaks of the third pattern of peaks.

4. The user interface of claim 3, wherein the second mode includes a fourth pattern of peaks, the second actuator being positioned at one of the peaks of the fourth pattern of peaks.

5. The user interface of claim 1, wherein the first mode is a (2, 2) mode and the second mode is a (3, 3) mode.

6. The user interface of claim 1, wherein the first mode is a (2, 2) mode and the second mode is a (4, 3) mode.

7. The user interface of claim 1, wherein the perimeter is rectangular with first, second, third, and fourth sides, a first corner joining the first and second sides, a second corner joining the second and third sides, a third corner joining the third and fourth sides, and a fourth corner joining the fourth and first sides.

8. The user interface of claim 7, wherein the first actuator is positioned at the first side and the second actuator is positioned at the second corner.

9. The user interface of claim 8, wherein the first actuator is positioned at a first midpoint on the first side between the first and fourth corners.

10. The user interface of claim 1, wherein the first and second actuators are configured to generate the haptic response with a force of at least 10 Gee over the entire touch screen panel.

11. The user interface of claim 1, wherein the display element is an avionics touch screen panel.

12. The user interface of claim 10, wherein the haptic response is the same over the entire touch screen.

13. The user interface of claim 1, wherein the display element has a width of at least 15 inches.

14. A method for controlling haptic feedback in a user interface having a first actuator and a second actuator coupled to a touch screen display panel, wherein the touch screen display panel is defined by a perimeter with a plurality of sides joined at a plurality of corners, the method comprising the steps of:
operating the first actuator adjacent one of the sides of the touch screen display panel in a first mode to generate a first portion of the haptic feedback on touch screen panel with first nodes and peaks, wherein the step of operating the first actuator includes operating the first actuator on the user interface with floating edges; and
operating the second actuator adjacent one of the corners of the touch screen display panel in a second mode to generate a second portion of the haptic feedback on touch screen panel with second nodes and peaks, different from the first nodes and peaks, wherein the first actuator and the second actuator are asymmetrically arranged with respect to one another relative to the touch screen panel,
wherein the steps of operating the first actuator and operating the second actuator include operating the first actuator and the second actuator such that a combined haptic feedback is at least 10 Gee over the entire touch screen panel and such that one of the first peaks or one of the second peaks occurs at each of the plurality of corners.

15. The method of claim 14, further comprising the step of selecting the first mode based on a first frequency associated with the first mode and selecting the second mode based on a second frequency associated with the second mode.

16. A method for designing a user interface having a first actuator and a second actuator generating haptic feedback on a touch screen display panel, wherein the touch screen display panel is defined by a perimeter with a plurality of sides joined at a plurality of corners, the method comprising the steps of:
selecting a first mode with a first frequency and a pattern of first nodes and first peaks;
selecting a second mode with a second frequency and a pattern of second nodes and second peaks such that the second nodes are non-overlapping with respect to the first nodes;
positioning the first actuator at one of the first peaks to generate the first mode wherein the step of positioning the first actuator includes positioning the first actuator on a first floating edge adjacent one of the sides of the touch screen display panel and centered along the one of the sides of the touch screen display panel; and
positioning the second actuator at one of the second peaks to generate the second mode, wherein the step of positioning the second actuator includes positioning the second actuator on a second floating edge adjacent one of the corners of the touch screen display panel such that the first and second actuator are asymmetrical relative to one another and such that one of the peaks of the first pattern or the second pattern occurs at each of the plurality of corners.

17. The method of claim 16, wherein the step of selecting the first mode with the first frequency includes selecting the first mode based on a tactile sensation associated with the first frequency, and wherein the step of selecting the second mode with the second frequency includes selecting the second mode based on a tactile sensation associated with the second frequency.

18. The method of claim 16, wherein the steps of positioning the first actuator and positioning the second actuator include positioning the first actuator and the second actuator such that a combined haptic feedback of resulting from the first peaks and the second peaks is at least 10 Gee over the entire touch screen display panel.

19. The method of claim 16, wherein the selecting the first mode includes determining a first resonant frequency as the characteristic frequency of the eigen-function associated with the first mode, and the selecting the second mode includes determining a second resonant frequency as the characteristic frequency of the eigen-function associated with the second mode.

* * * * *